United States Patent
Kawada et al.

(10) Patent No.: US 7,225,555 B2
(45) Date of Patent: Jun. 5, 2007

(54) LINEAR SCALE ATTACHMENT DEVICE AND ATTACHMENT METHOD

(75) Inventors: Hiroaki Kawada, Kawasaki (JP); Seiji Sakagami, Kawasaki (JP); Hiroatsu Mori, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 2 days.

(21) Appl. No.: 11/179,663

(22) Filed: Jul. 13, 2005

(65) Prior Publication Data

US 2006/0016089 A1 Jan. 26, 2006

(30) Foreign Application Priority Data

Jul. 20, 2004 (JP) .............................. 2004-212051

(51) Int. Cl.
*A45B 3/08* (2006.01)
(52) U.S. Cl. ....................................................... 33/706
(58) Field of Classification Search ................. 33/706, 33/707, 708
See application file for complete search history.

(56) References Cited

U.S. PATENT DOCUMENTS

| | | | |
|---|---|---|---|
| 2,543,476 A | 2/1951 | Southern | |
| 3,600,811 A * | 8/1971 | Weyrauch | ..................... 33/707 |
| 3,816,002 A * | 6/1974 | Wieg | ........................... 356/395 |
| 4,559,707 A * | 12/1985 | Oberhans | ..................... 33/702 |
| 5,157,846 A | 10/1992 | Fromme | |
| 5,488,782 A * | 2/1996 | Ochiai | ......................... 33/708 |
| 5,630,283 A | 5/1997 | Nelle | |
| 5,987,768 A * | 11/1999 | Freitag et al. | ................. 33/706 |
| 6,119,359 A * | 9/2000 | Suzuki et al. | ................. 33/832 |
| RE37,490 E * | 1/2002 | Andermo et al. | ............. 33/810 |
| 6,739,067 B2 * | 5/2004 | Muller | ......................... 33/703 |
| 6,904,696 B2 * | 6/2005 | Boge et al. | ................... 33/706 |
| 2002/0133964 A1 * | 9/2002 | Steinich et al. | ............... 33/708 |

FOREIGN PATENT DOCUMENTS

| | | |
|---|---|---|
| DE | 43 20 728 A1 | 1/1995 |
| JP | A 59-138915 | 8/1984 |
| JP | A 59-224501 | 12/1984 |

* cited by examiner

*Primary Examiner*—G. Bradley Bennett
*Assistant Examiner*—Travis Reis
(74) *Attorney, Agent, or Firm*—Oliff & Berridge, PLC

(57) ABSTRACT

A linear scale attachment device for holding and securely attaching a linear scale on an object to be measured is disclosed. The device includes an aluminum base formed with a holding groove having a larger opening than the width of a linear scale that is fitted in this groove, and a retainer for preventing the linear scale fitted in the holding groove from falling off. The base is permanently attached to the object at one location in the lengthwise direction, and resiliently attached at one or more other locations such as to be pressed in the X and Y directions using a cantilever plate spring. While using an aluminum base, the attachment device allows easy attachment and maintenance of the scale and relieves the effect of thermal stress caused by a difference in the thermal expansion coefficient between the aluminum base and the object.

9 Claims, 5 Drawing Sheets

Permanent attachment (at center)

Resilient attachment (A)

(B)

LINEAR SCALE ATTACHMENT DEVICE AND ATTACHMENT METHOD

CROSS-REFERENCE TO RELATED APPLICATION

The disclosure of Japanese Patent Application No. 2004-212051 filed Jul. 20, 2004 including specifications, drawings and claims is incorporated herein by references in their entireties.

BACKGROUND OF THE INVENTION

1. Field of the Invention

The present invention relates to a device and a method for holding and securely attaching a linear scale on an object to be measured. More particularly, the invention relates to a linear scale attachment device and attachment method which allow easy attachment to an object to be measured and maintenance of the scale, and which can relieve the effect of thermal stress caused by a difference in thermal expansion coefficient between the linear scale and the object made of a different material from the scale.

2. Description of the Related Art

An attachment device used for attaching a relatively long linear scale such as a glass scale or thin metal tape scale on a machine to be measured generally includes a base that has both functions of holding the scale and fixing the scale on the machine.

Such an attachment device requires to be small and lightweight, and should allow easy attachment to the target machine and maintenance of the scale. Further, the device should have a structure that relieves the effect of thermal stress caused by different thermal expansion coefficients of the materials for the device and the machine. These requirements are particularly important for metal linear scales commonly called tape scales, which can sometimes have an entire length of more than 10 m.

A conventional technique devised to satisfy the above requirements is disclosed in Japanese Patent Laid-Open Publication No. Sho 59-224501. A tape-like scale is inserted into a hollow base from one end in a lengthwise direction. As the scale sometimes cannot be inserted smoothly because of size variation and the like, high-frequency vibration is applied during the insertion of the scale using a vibration generator. Japanese Patent Laid-Open Publication No. Sho 59-138915 discloses a technique in which the scale is pulled from one direction into a similar base using a spring.

Some such attachment devices in practical use are provided with an aluminum base. In some applications, the base may be permanently attached to an iron machine using a screw, or, tacked to the machine using a double-sided tape. Here, the thermal expansion coefficient of aluminum is different from that of iron.

However, when the aluminum base is permanently attached to the iron machine using a screw, the measurement accuracy may be degraded because of thermal stress caused by a difference in thermal expansion coefficient between aluminum and iron. The effect of thermal stress can be reduced by resiliently attaching the scale onto the machine using a double-sided tape, but such tape is inferior in respect to easy attachment or maintenance of the scale, and long-term stability.

Thus, while conventional aluminum bases for holding and fixing scales on an object to be measured are small and lightweight, there still is a scope of improvement for securely attaching a relatively long scale on a machine, such as various problems described above.

SUMMARY OF THE INVENTION

In view of the foregoing problems, various embodiments of this invention provide an attachment device using an aluminum base which allows the scale to be readily attached to a machine and easily maintained, and which can relieve (reduce) the effect of thermal stress caused by a difference in the material between the base and the machine.

To achieve the above object, various embodiments of the invention provide a linear scale attachment device for holding and securely attaching a linear scale on an object to be measured, comprising: a base having a holding groove in which the linear scale can fit, the groove having a larger opening than the width of the scale; and retaining means for preventing the linear scale fitted in the holding groove from falling off. In this device, the base is permanently attached to the object at one location in a lengthwise direction, and resiliently attached to the object at one or more other locations.

The retaining means may include a fitting part that can fit in a concave formed in the base near the holding groove and a closure part continuous with the fitting part. The closure part may be pressing means for pressing the linear scale fitted in the holding groove.

The base may be formed with a fixing groove having side walls converging towards a contact surface between the base and the object, and the base may be resiliently attached to the object by biasing means abutted-on one of the side walls toward the object.

According to the present invention, because the holding groove formed in the base for holding the linear scale has a larger opening than the width of the scale, the linear scale can easily be fitted from the front into the groove through the opening after the base has been fixed to the object. Also, the scale is securely retained by the retaining means. The attachment device thus ensures easy attachment and maintenance of the scale. Moreover, because the base is permanently attached to the object at one location in the lengthwise direction, the base is precisely positioned in the lengthwise direction, and moreover, even when there is a large difference in thermal expansion coefficient between the base and the object, the effect of thermal stress caused by the difference is absorbed and relieved because the base is resiliently attached to the object at other locations.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Various embodiments of this invention will be hereinafter described in detail with reference to the drawings.

Figure 1:
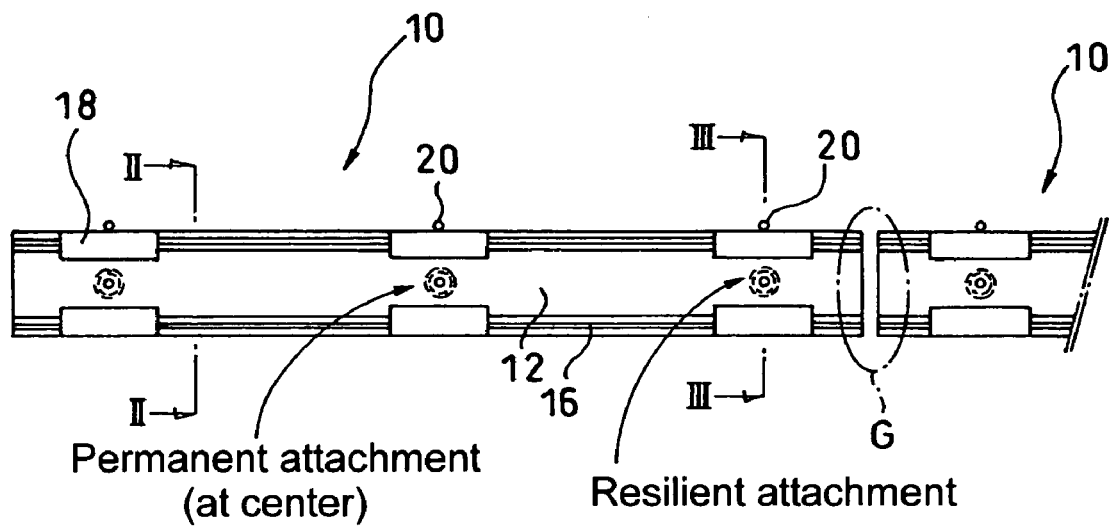
FIG. 1 is a schematic plan view showing a linear scale attachment device according to a first embodiment of the present invention.
Figure 2:
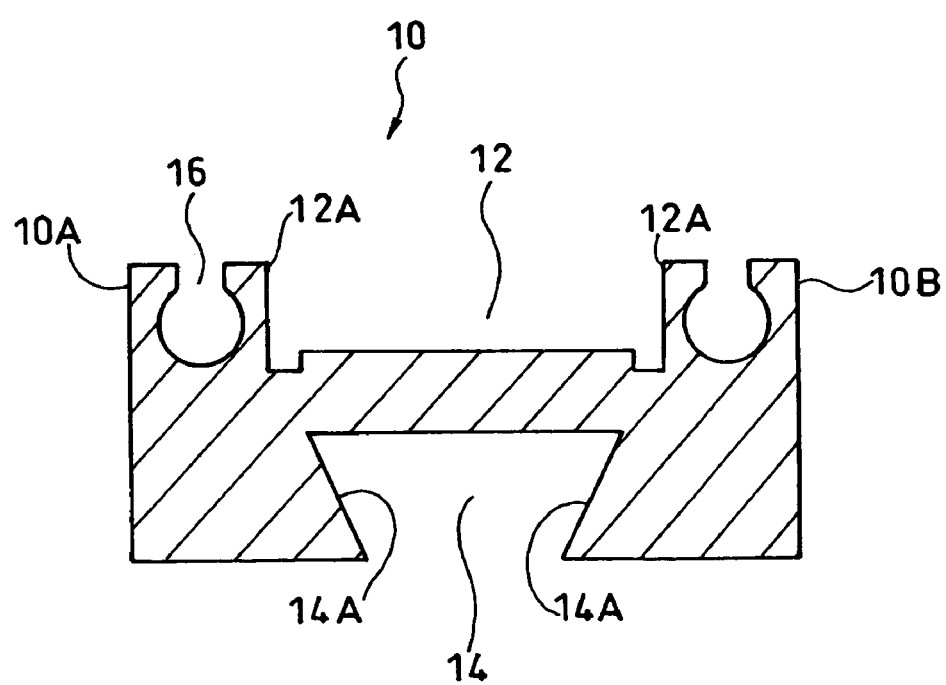
FIG. 2 is an enlarged cross-sectional view taken along the line II-II of FIG. 1 of the aluminum base of the attachment device.
Figure 3:
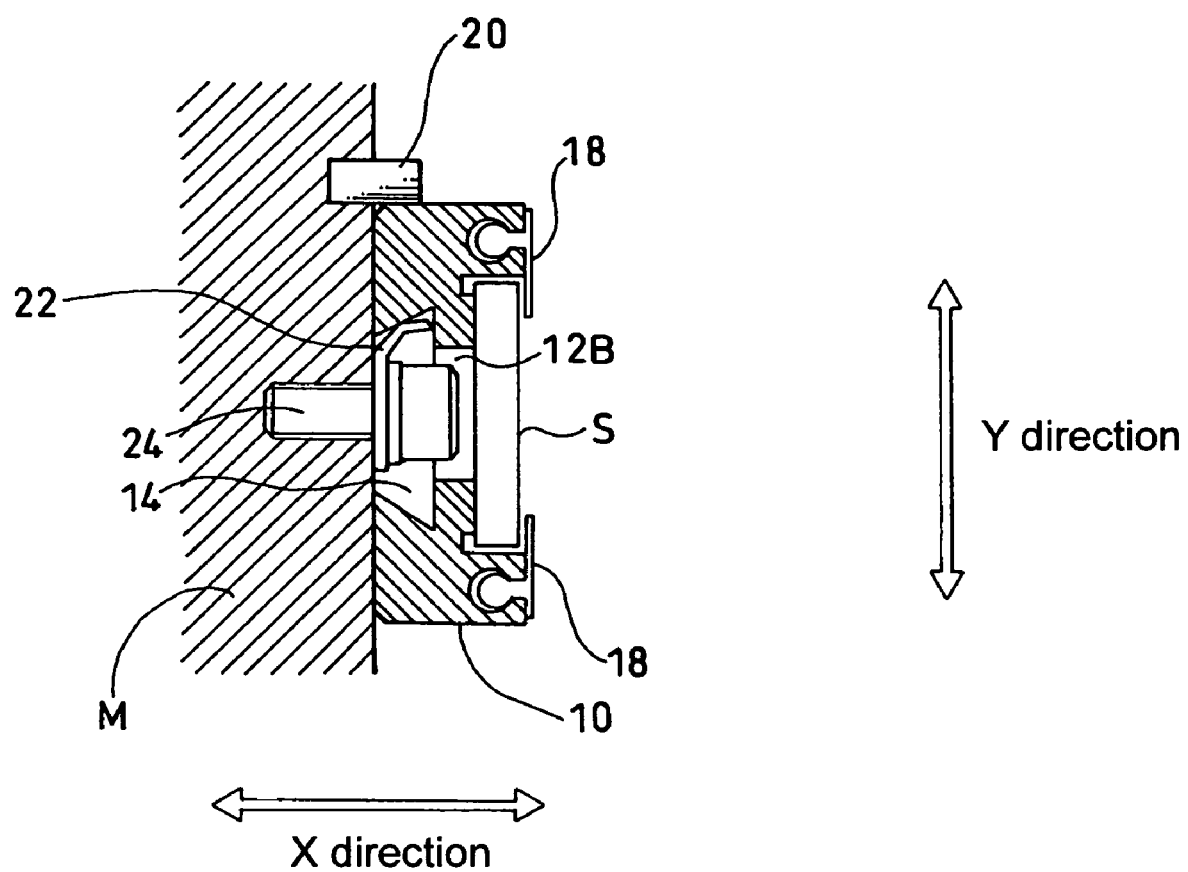
FIG. 3 is an enlarged cross-sectional view taken along the line III-III of FIG. 1 of the attachment device in use.

FIG. 1 to FIG. 3 show a linear scale attachment device according to a first embodiment of the invention. FIG. 1 is a plan view of the entire device without the linear scale, FIG. 2 is an enlarged cross-sectional view of the base, and FIG. 3 is an enlarged cross-sectional view taken along the line III-III of FIG. 1 showing the device in use.

The linear scale attachment device includes a base 10 for holding a linear scale such as a tape scale and fixing the scale on an object to be measured, and a retaining means that will be described later. In this embodiment, the base 10 is an aluminum extrusion for size and weight reduction (hereinafter referred to as "aluminum base"). The extrusions are produced in separate pieces of an appropriate length of, e.g., 1 m.

A holding groove 12 for holding the linear scale S is formed in the upper part (front surface) of the aluminum base 10. In the lower part is formed a fixing groove 14 for securely attaching the base 10 on a machine M or object to be measured.

The holding groove 12 is large enough for the linear scale S to fit in, and its opening 12A in the surface plane of the base 10 is larger than the width of the scale S. The fixing groove 14 has two opposing side walls (inclined surfaces) 14A that are inclined inwardly such as to converge towards the backside of the base.

The base includes base bodies 10A and 10B on both sides, which are respectively formed with enlarged grooves (concaves) 16 that are wider inside than on the surface. The grooves 12, 14, and 16 are all formed continuously along the length by extrusion forming.

Figure 4:
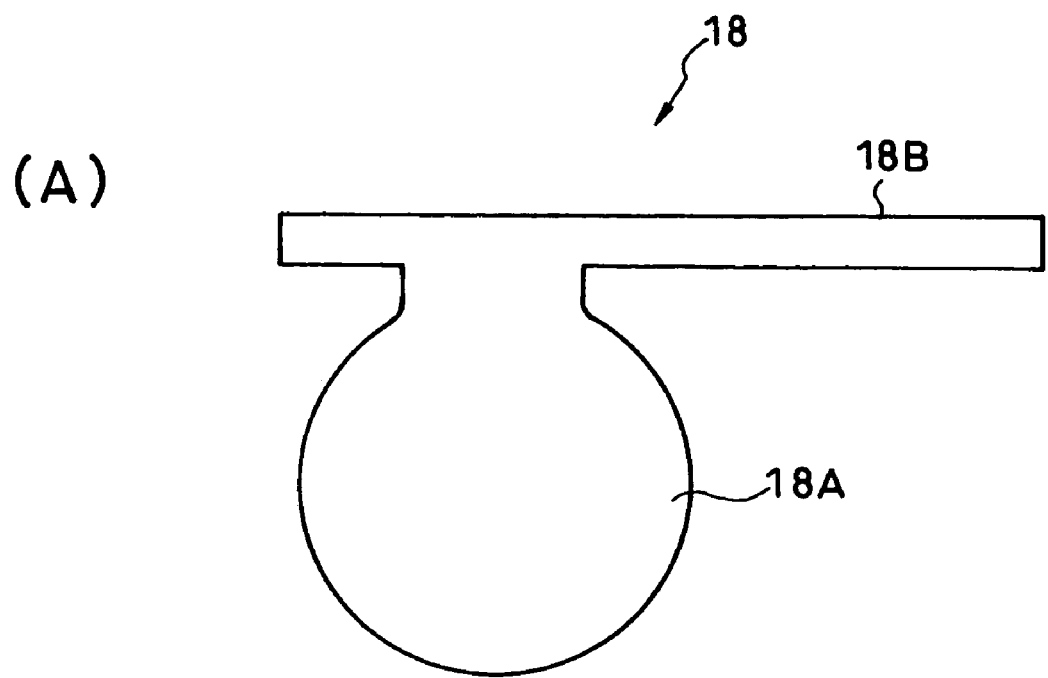
FIG. 4A and FIG. 4B are schematic cross-sectional views showing examples of retainers in enlargement.
Figure 4:
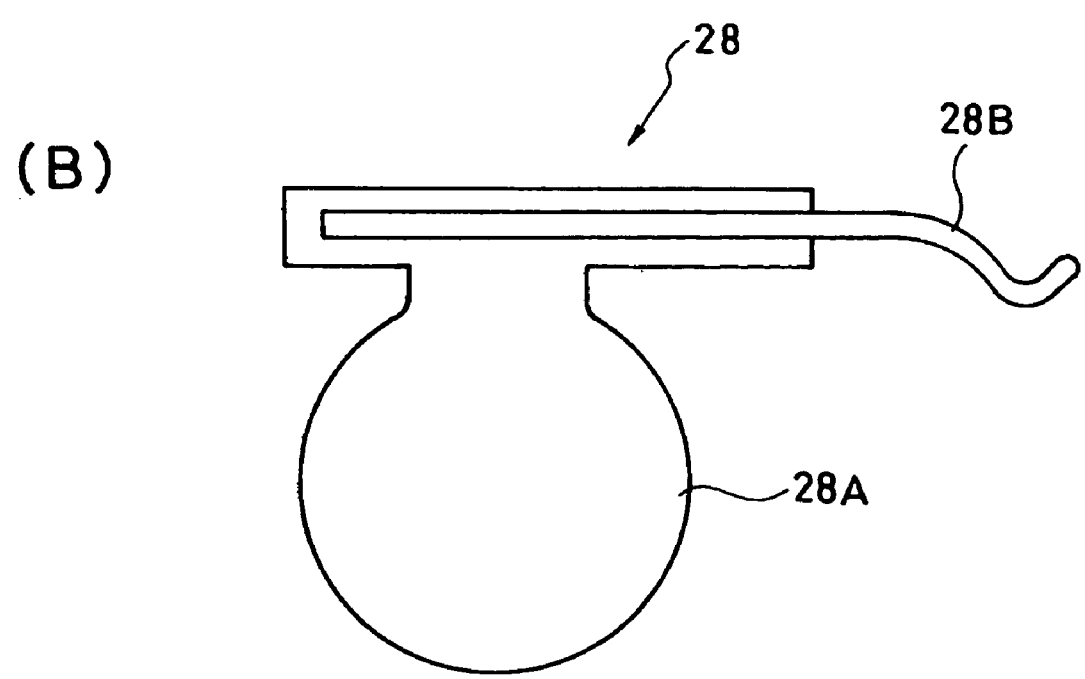

Plastic retainers (retaining means) 18 are provided separately of the aluminum base 10. As shown in FIG. 4A in enlargement, the retainer 18 has an enlarged part (fitting part) 18A having a cross-sectional shape similar to that of the enlarged groove 16 so that the retainer can fit in the groove 16, and a thin-plate closure part 18B continuous with the enlarged part 18A. The retainer 18 may be several cm long, or may extend the entire length of the aluminum base 10, which is, e.g., 1 m.

A plurality of attachment positions are located along the length of the aluminum base 10 where attachment holes 12B are bored in the bottom of the holding groove 12 through to the fixing groove 14 as shown in FIG. 3. The aluminum base 10 is attached at these positions either permanently using screws or resiliently as described in the following.

In this embodiment, the aluminum base 10 is first fixed to the machine M to be measured before holding the linear scale S. One side edge of the base is abutted on a reference pin 20 provided on the machine M for the positioning purpose, and the backside of the base (contact surface) is made in contact with the attachment surface of the machine M. A cantilever plate spring 22 is abutted on the inclined surface 14A on the side of the reference pin 20, and a screw 24 is fastened, so that the base is pressed against the machine diagonally upwards. That is, the cantilever plate spring 22 presses the aluminum base 10 toward the reference pin 20 and toward the machine M, whereby the positioning in up and down directions denoted at Y in FIG. 3 and the resilient attachment in the X direction of the base to the machine M are both achieved.

Figure 5:
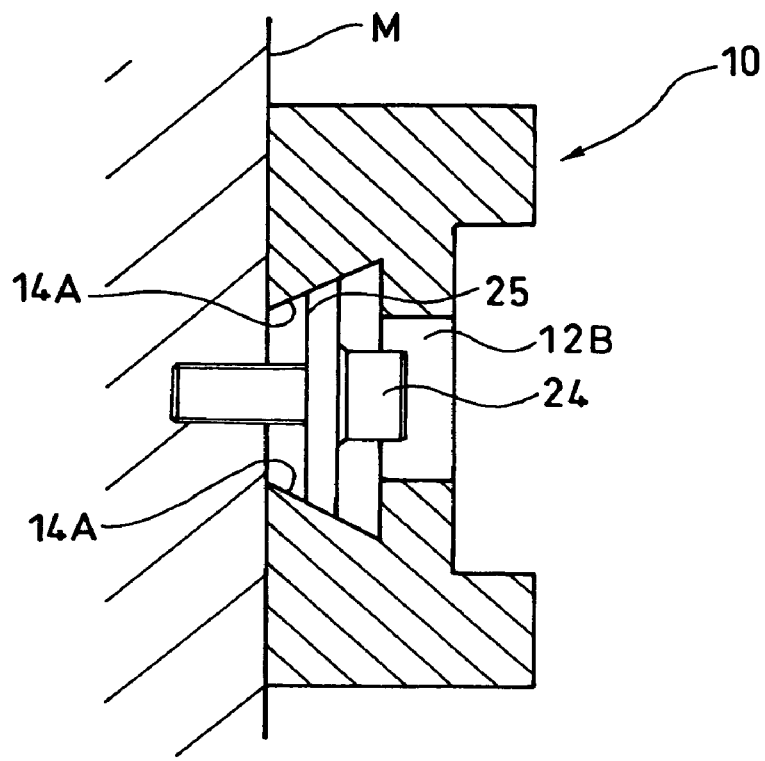
FIG. 5 is a cross-sectional view showing one example of a permanent attachment method.

The aluminum base 10 is resiliently attached using the cantilever plate springs 22 at both ends, but is securely attached at the center. In the center attachment portion of the base, as shown in the schematic diagram of FIG. 5, a plate 25 having high rigidity is abutted on both inclined surfaces 14A instead of the cantilever plate spring 22, and a screw 24 is fastened. The permanent attachment may also be achieved using a powerful plate spring or by a conventional screw fastening (not shown).

The linear scale S is then fitted into the holding groove 12, and the resilient enlarged part 18A of the retainer 18 is forcibly fitted into the enlarged groove 16 to attach the retainer 18. The closure part 18B closes part of the opening 12A of the holding groove 12, thereby preventing the scale S from falling off. The scale S is thus reliably held on the base 10.

The aluminum base 10 in this embodiment is produced in separate pieces of an appropriate length of, e.g., 1 m. When in use, a plurality of aluminum bases 10 are arranged end to end with an appropriate distance G of, e.g., 0.1 mm as shown in FIG. 1 to have a long length equal to that of the long scale (e.g., 10 m, 20 m, 30 m, etc.). The aluminum base is therefore free of limitations on transportation.

As each of the aluminum bases 10 having an appropriate length is secured at the center using a powerful plate spring or the like and at both ends using less powerful plate springs, the generation of thermal stress due to different thermal expansion coefficients of the machine M and the base is relieved and displacement of the base is minimized.

The cantilever plate spring 22 presses the aluminum base 10 towards the machine in the X direction and toward the reference pin 20 in the Y direction, so that displacement of the base 10 in both X and Y directions is restricted.

When the need arises for the scale S to be extended, it is only necessary to increase the number of aluminum bases 10 that are arranged end to end. This way, also, an increase in the thermal stress is avoided.

With this attachment method of aluminum base 10, thermal stress is relieved substantially as compared to the conventional permanent attachment method. Also, the method improves the ease of attachment and maintenance of the scale, and long-term stability, as compared to the conventional attachment method using a double-sided tape.

The linear scale S is fitted into the holding groove 12 from the front (X direction) of the aluminum base 10, after which the retainers 18 are attached at predetermined positions, whereby the scale S is securely held in position.

Figure 6:
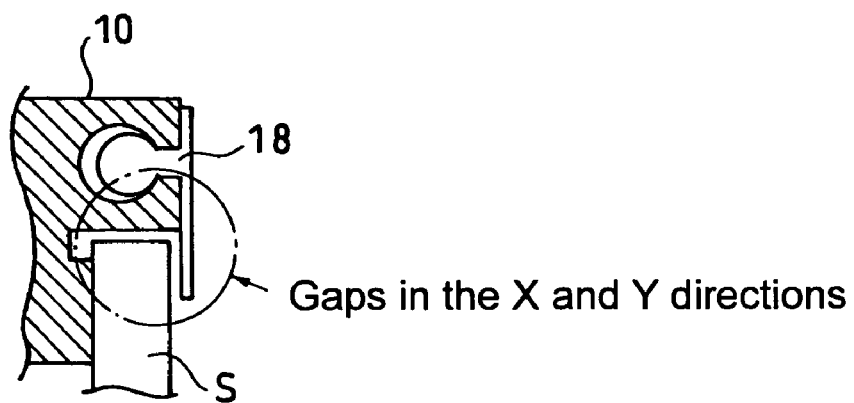
FIG. 6 is an enlarged partial cross-sectional view showing gaps between the linear scale and the aluminum base.

When the permissible range of the setting position of the linear scale S is relatively wide or when the scale is relatively short, the linear scale S may be attached to the machine M with a gap of about 0.1 mm between the scale S and the aluminum base 10, as indicated by a circle in FIG. 6, which is an enlargement of the upper part of FIG. 3. The scale S can be securely attached to the machine with the above-described first embodiment of the attachment device using retainers 18 that are integrally molded from a plastic material having rubber resiliency such as a silicone resin or the like.

Figure 7:
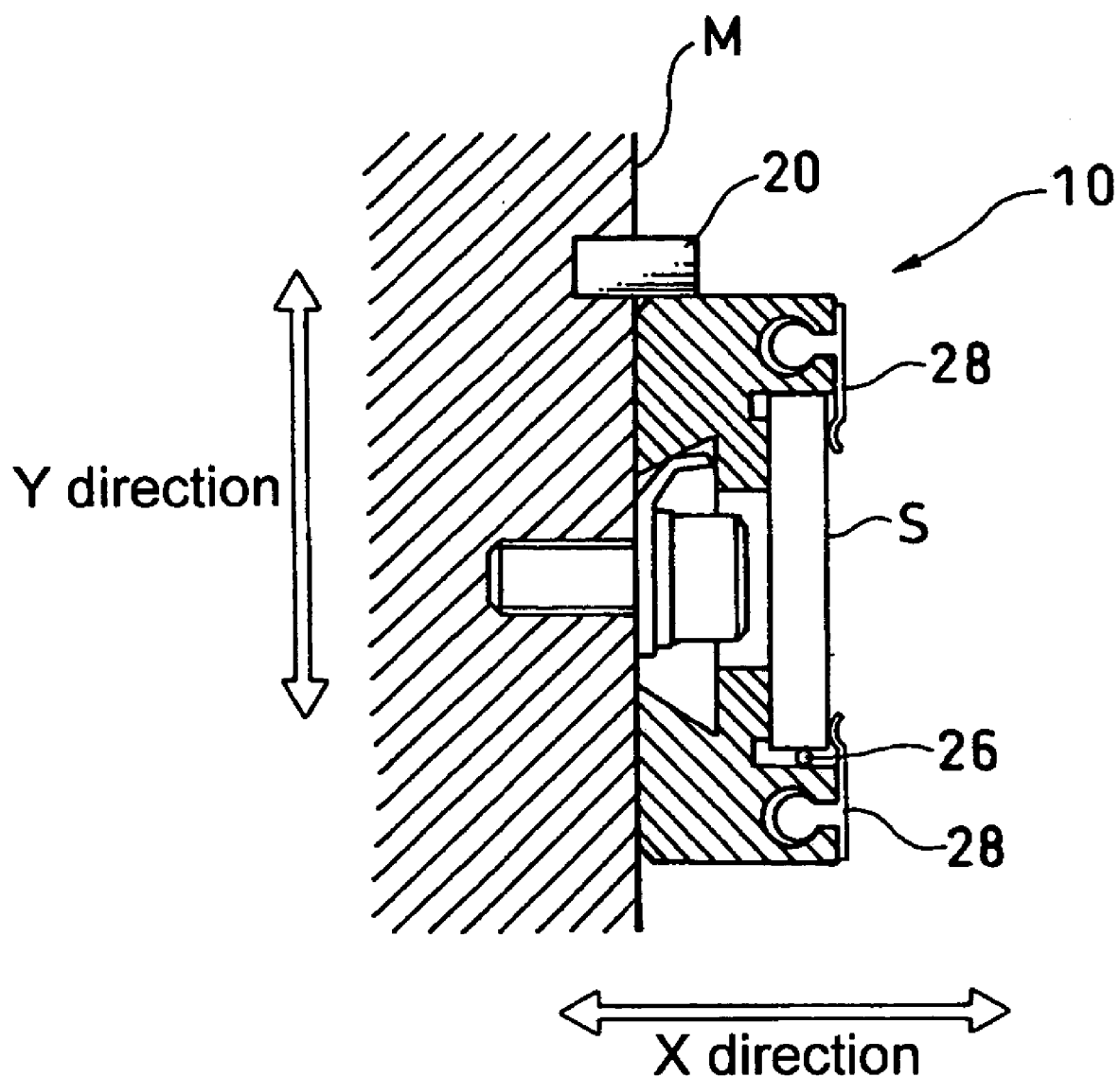
FIG. 7 is an enlarged cross-sectional view showing an attachment device in use according to a second embodiment, which is a similar view to FIG. 3.

FIG. 7 shows a second embodiment, which is suitably used when no gap should be permitted between the scale and the base either in the X or Y direction.

When the permissible range of the scale setting position is relatively narrow, or when the scale is expected to be used under vibration or the like, retaining means having a function for resiliently holding the scale S in the X and Y directions is used. More specifically, a silicone resin component (spacer) 26 having rubber resiliency is interposed between one side of the scale S and the holding groove 12, for the resilient support in the Y direction. A retaining plate spring 28 retains the scale S in the X direction. The retaining-plate spring 28 consists of a plastic enlarged part 28A similar to the enlarged part 18A and a plate spring (pressing means) 28B integrally formed with the enlarged part 28A, as shown in the enlarged cross-sectional view of FIG. 4B. The linear scale S is thus tightly held in the holding groove 12 without any play.

With the conventional techniques shown in the Japanese Patent Laid-Open Publication No. Sho 59-244501 and the like mentioned above, the work of attaching the scale to the aluminum base can be complicated due to size variation as it requires inserting the scale into a hollow base from a lengthwise direction. Compared to this, the attachment device of the invention allows easier attachment and maintenance of the linear scale S, as the scale can be simply and securely attached from the front of the aluminum base 10.

To achieve the positioning of the linear scale S at one point in the lengthwise direction, the retaining plate spring 28 shown in FIG. 4B may be used at one position and the plastic retainer 18 shown in FIG. 4A may be used for retaining the scale at the one or more other positions.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A linear scale attachment device for holding and securely attaching a linear scale on an object to be measured, comprising:
    a base having a holding groove in which the linear scale can fit, the groove having a larger opening than the width of the scale, and having a hole in a bottom part for attaching the scale to the object to be measured, the hole being bored through the holding groove; and
    retaining means for preventing the linear scale fitted in the holding groove from falling off,
    wherein the base is:
        permanently attached to the object at one location in a lengthwise direction,
        formed with a fixing groove having side walls converging towards a contact surface between the base and the object, the bore extending from the holding groove to the fixing groove, and
        resiliently attached to the object by a plate spring abutted on one of the side walls of the fixing groove at one or more other locations and biasing the base towards the object.

2. The linear scale attachment device according to claim 1, wherein
    the retaining means includes a fitting part that can fit in a concave formed in the base near the holding groove, and a closure part continuous with the fitting part.

3. The linear scale attachment device according to claim 2, wherein
    the concave is a groove having a cross section that increases from surface to interior.

4. The linear scale attachment device according to claim 2, wherein
    the closure part is pressing means for pressing the linear scale fitted in the holding groove.

5. The linear scale attachment device according to claim 2, wherein
    the retaining means further includes biasing means for causing the scale to make contact with the holding groove.

6. The linear scale attachment device according to claim 5, wherein
    the biasing means includes pressing means integrally formed with the closure part and a spacer interposed between one side of the scale and the holding groove.

7. A method of holding and securely attaching a linear scale on an object to be measured, comprising:
    permanently attaching a base to the object at one location in a lengthwise direction,
    forming the base with a fixing groove having side walls converging towards a contact surface between the base and the object,
    resiliently attaching the base to the object by a plate spring abutted on one of the side walls of the fixing groove at one or more locations,
    biasing the base toward the object with the plate spring acting on the side wall, the base being formed with a holding groove having a larger opening than the width of the linear scale that is fitted in the holding groove; and
    fitting retaining means in the holding groove for preventing the linear scale from falling off.

8. The linear scale attachment method according to claim 7, wherein
    the holding groove has a hole bored in a bottom part, and the base is permanently or resiliently attached to the object using the hole.

9. The linear scale attachment method according to claim 7, wherein
    the scale is securely attached to a plurality of the bases arranged end to end in the lengthwise direction.

* * * * *